(12) United States Patent
Handt et al.

(10) Patent No.: US 11,978,601 B2
(45) Date of Patent: May 7, 2024

(54) DC NETWORK

(71) Applicant: Siemens Aktiengesellschaft, Munich (DE)

(72) Inventors: Karsten Handt, Berg (DE); Stefan Hänsel, Erlangen (DE); Boris Kuschel, Chemnitz (DE); Jörg Weiss, Chemnitz (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 303 days.

(21) Appl. No.: 17/608,769

(22) PCT Filed: Mar. 12, 2020

(86) PCT No.: PCT/EP2020/056635
§ 371 (c)(1),
(2) Date: Nov. 4, 2021

(87) PCT Pub. No.: WO2020/224832
PCT Pub. Date: Nov. 12, 2020

(65) Prior Publication Data
US 2023/0253170 A1 Aug. 10, 2023

(30) Foreign Application Priority Data
May 8, 2019 (EP) .................... 19173331

(51) Int. Cl.
*H02H 9/00* (2006.01)
*H01H 9/54* (2006.01)
(Continued)

(52) U.S. Cl.
CPC .......... *H01H 33/596* (2013.01); *H01H 9/541* (2013.01); *H02H 9/04* (2013.01); *H02J 1/06* (2013.01)

(58) Field of Classification Search
None
See application file for complete search history.

(56) References Cited

U.S. PATENT DOCUMENTS

| | | | | |
|---|---|---|---|---|
| 5,444,595 A | * | 8/1995 | Ishikawa | H03K 3/0231 361/87 |
| 5,488,533 A | * | 1/1996 | Cassidy | H02H 9/025 361/87 |

(Continued)

FOREIGN PATENT DOCUMENTS

| | | | | |
|---|---|---|---|---|
| WO | 2014 117807 | | 8/2014 | ............. H03K 17/00 |
| WO | 2016 096016 | | 6/2016 | ............... H01H 9/54 |

OTHER PUBLICATIONS

Search Report for International Application No. PCT/EP2020/056635, 10 pages, dated Jun. 19, 2020.

*Primary Examiner* — Stephen W Jackson
(74) *Attorney, Agent, or Firm* — Slayden Grubert Beard PLLC

(57) ABSTRACT

Various embodiments of the teachings herein include a DC network comprising: an electrical conductor; a switching unit arranged at one end of the conductor to break the electrical connection via the conductor, the switching unit including a controllable power semiconductor connected in series in the current path of the conductor; wherein the conductor includes a first section and a second section starting from the switching unit with a connection point between the first section and the second section; a first overvoltage protection apparatus connected between the connecting point and a second pole of the DC network; and a second overvoltage protection apparatus connected between that end of the second section remote from the switching unit and the second pole. The overvoltage protection apparatuses each have a capacitor.

11 Claims, 2 Drawing Sheets

(51) Int. Cl.
*H01H 33/59* (2006.01)
*H02H 9/04* (2006.01)
*H02J 1/06* (2006.01)

(56) References Cited

U.S. PATENT DOCUMENTS

| | | | |
|---|---|---|---|
| 8,803,358 B2* | 8/2014 | Hafner | H02H 7/268 363/51 |
| 2022/0077678 A1* | 3/2022 | Yang | H01H 33/596 |
| 2022/0130628 A1* | 4/2022 | Köllensperger | H02J 1/102 |

* cited by examiner

DC NETWORK

CROSS-REFERENCE TO RELATED APPLICATIONS

This application is a U.S. National Stage Application of International Application No. PCT/EP2020/056635 filed Mar. 12, 2020, which designates the United States of America, and claims priority to EP Application No. 19173331.0 filed May 8, 2019, the contents of which are hereby incorporated by reference in their entirety.

TECHNICAL FIELD

The present disclosure relates to DC networks. Various embodiments include DC networks having a first and a second pole and at least one switching unit to break a conductor of the first pole.

BACKGROUND

In future industrial installations, DC grids are intended to reduce losses, guarantee the direct exchange of energy between converters, storage units and motors and achieve increased robustness. Grids of this type can have very different cable lengths between the different load circuits and infeeds. Short cable lengths that are present lead to very low series inductances in the supply lines, meaning that fault currents can have very steep rises in current. This requires very rapid fault detection and fault disconnection.

Since mechanical isolator switches cannot meet the requirements relating to the switching speed, power semiconductors are used. Following fault detection, said power semiconductors disconnect the fault in a few 100 ns. Since the current through the load inductors now has no freewheeling path, a voltage can consequently build up across the power semiconductor and can sometimes destroy it. In order to counter this, the switch can have an overvoltage limiting system. It is disadvantageous that this has to be configured for each switch for the actual line length or supply line inductance present, that is to say that the switch has to be adapted to suit the supply lines present, or else a switch may be used only up to a certain line length, since otherwise there is a risk of the overvoltage limiting system not being sufficient.

SUMMARY

The teachings of the present invention describe DC networks that reduces or solves the problem mentioned at the outset. For example, some embodiments of the teachings herein include a DC network (10) having an electrical conductor (121, 122) and a switching unit (19) arranged at one end of the conductor (121, 122) to break the electrical connection via the conductor (121, 122), wherein the switching unit (19) comprises at least one controllable power semiconductor that is connected in series in the current path of the conductor (121, 122), wherein the conductor (121, 122) is divided into a first and a second section (141, 142, 144, 145), starting from the switching unit (19), a first overvoltage protection apparatus (181, 183) is connected between the connecting point for the first and second sections (141, 142, 144, 145) and a second pole of the DC network (10), a second overvoltage protection apparatus (182, 184) is connected between that end of the second section (142, 145) that is remote from the switching unit (19) and the second pole, the overvoltage protection apparatuses (181 ... 184) each have a capacitor (30).

In some embodiments, there is one load (16), a plurality of further switching units and a plurality of further electrical conductors that connect the switching units and load (16) and are divided into sections, wherein, for the connecting points for each pair of connected sections of the further conductors, an overvoltage protection apparatus is connected between the connecting point and the second pole.

In some embodiments, the switching unit (19) and the further switching units are of the same design.

In some embodiments, the length or the inductance of the sections (141 ... 146) is chosen in such a way that an overvoltage that forms in the event of disconnection by the switching unit (19) remains below the breakdown voltage of the controllable power semiconductor.

In some embodiments, the switching unit (19) comprises a switching unit capacitor that is connected between the first and second poles of the DC network and has a capacitance of at least 10 µF, in particular at least 50 µF, in particular at least 100 µF.

In some embodiments, the capacitors (30) of the overvoltage protection apparatuses (181 ... 184) each have a capacitance of at least 10 µF, in particular at least 50 µF, in particular at least 100 µF.

In some embodiments, the overvoltage protection apparatuses (181 ... 184) each have an oscillation damping resistor (31) connected in series with the capacitor (30), in particular a resistor with a value of less than 10 ohms.

In some embodiments, the overvoltage protection apparatuses (181 ... 184) each comprise a diode (32) connected in series with the capacitor (30), wherein the diode (32) is connected to block a flow of current from the capacitor (30) to the first pole.

In some embodiments, the overvoltage protection apparatuses (181 ... 184) comprise a spark gap (33) connected in series with the capacitor (30).

In some embodiments, the overvoltage protection apparatuses (181 ... 184) have a controllable power semiconductor, in particular a thyristor (34), connected in series with the capacitor (30).

In some embodiments, the overvoltage protection apparatuses (181 ... 184) comprise an overvoltage element, in particular a varistor (36), in parallel with the capacitor (30).

In some embodiments, the overvoltage protection apparatuses (181 ... 184) comprise a discharge resistor (35) in parallel with the capacitor (30).

BRIEF DESCRIPTION OF THE DRAWINGS

Further advantages and features can be taken from the following description of exemplary embodiments based on the figures. In the figures, identical reference signs denote identical components and functions. In the figures.

DETAILED DESCRIPTION

Figure 1:
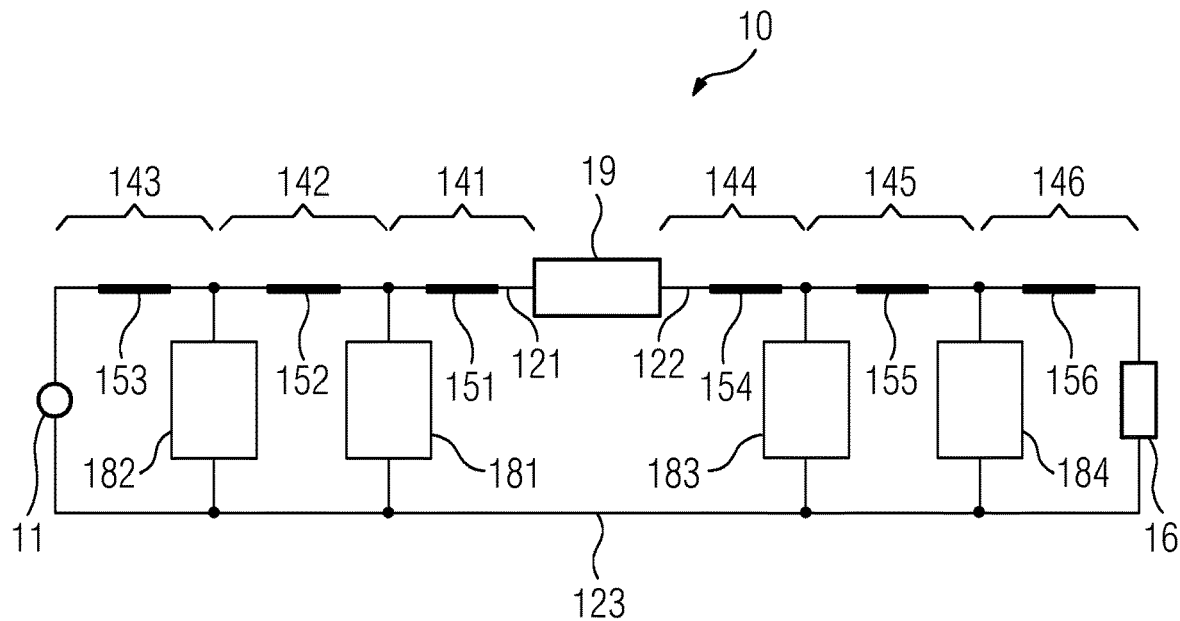
FIG. 1 shows an example DC network having switching units to break electrical conductors and overvoltage protection apparatuses.

In some embodiments, the DC network includes an electrical conductor and a switching unit arranged at one end of the conductor to break the electrical connection via the conductor. The switching unit comprises at least one controllable power semiconductor that is connected in series in the current path of the conductor. The conductor is divided into a first and a second section, starting from the switching unit. In other words, the first section extends from the switching unit as far as a connecting point for the first and second sections. The second section extends from there.

A first overvoltage protection apparatus is connected between the connecting point for the first and second sections and a second pole of the DC network. The conductor therefore forms the first pole of the DC network. A second overvoltage protection apparatus is connected between that end of the second section that is remote from the switching unit and the second pole. The first and second overvoltage protection apparatuses are therefore connected in parallel; however, between the points at which they are connected to the conductor, that is to say the first pole of the DC network, there is a piece of conductor having the length of the second section. Between the points at which the first overvoltage protection apparatus and the switching unit are connected, there is a piece of conductor having the length of the first section. The overvoltage protection apparatuses each have a capacitor.

The lengths of the first and second sections are expediently at least more than 1 m, in particular more than 10 m, in a particular configuration more than 50 m. In some embodiments, the switching unit is protected by the overvoltage protection apparatuses arranged at intervals on the conductor against the build-up of an overvoltage that occurs in the course of disconnection by the switching unit and has a damaging or destructive effect on the power semiconductor. The switching unit itself then only has to be configured for overvoltages that are caused by the inductance of the closest section, that is to say the first section. On the other hand, the inductance of the second section no longer matters for this.

In some embodiments, adaptations to the conductor in the form of the overvoltage protection apparatuses can be used instead of adaptations to the switching unit. Therefore, protective apparatuses of the same kind, and also switching units of the same kind, can be used in the DC network. There are therefore admittedly more components used compared to a network with adapted switching units, but only components of the same kind, which reduces complexity and increases reliability. The DC network therefore becomes easier to plan and manage.

In some embodiments, the overvoltage protection apparatuses having the capacitor between the poles of the DC network offer voltage stability and control reserve. Since said capacitor forms an oscillating system with the line inductance, a series resistor is present as damping. In some embodiments, the following features can also additionally be provided:

The DC network can comprise one or more loads, a plurality of further switching units and a plurality of further electrical conductors, wherein the further conductors connect the switching units and loads. The further conductors are likewise divided into sections, wherein, for the connecting points for each pair of connected sections of the further conductors, an overvoltage protection apparatus is connected between the respective connecting point and the second pole. Even in an extensive DC network, the further switching units are thus protected against excessive overvoltage by the insertion of overvoltage protection apparatuses into the conductors.

The switching unit and the further switching units in the DC network may be of the same design. In other words, only one type of switching unit, configured for a maximum voltage to be blocked, is used. The length or the inductance of the sections is expediently chosen in such a way that an overvoltage that forms in the event of disconnection by one of the switching units remains below the breakdown voltage of the controllable power semiconductor. All in all, there are therefore only two different types of component used for the disconnection in the DC network, namely one type of switching unit and one type of overvoltage protection apparatus.

The switching unit can comprise a switching unit capacitor that is connected between the first and second poles of the DC network and has a capacitance of at least 10 µF, in particular at least 50 µF, in particular at least 100 µF. As a result, the switch itself also has an intrinsic ability to take up the overvoltage of a certain conductor inductance without damage.

The capacitors of the overvoltage protection apparatuses can each have a capacitance of at least 10 µF, in particular at least 50 µF, in particular at least 100 µF. Only sufficiently high capacitances have a sufficiently stabilizing effect on the voltage to effectively relieve the switching unit of load.

The overvoltage protection apparatuses can each have an oscillation damping resistor connected in series with the capacitor, in particular a resistor with a value of less than 10 ohms. Oscillations in the oscillating system comprising the capacitor and the line inductances are therefore avoided, wherein, at the same time, the low resistance maintains the possibility of rapid charging of the capacitor.

The overvoltage protection apparatus can comprise a diode connected in series with the capacitor, wherein the diode is connected in such a way that a flow of current from the capacitor to the first pole of the DC network is blocked. This circuitry allows the capacitor to take up the energy rapidly in the case of disconnection in the event of a short circuit. The discharging is expediently still allowed but is slowed down by the resistor.

The overvoltage protection apparatus can comprise a spark gap connected in series with the capacitor. This creates a low-resistance current path, which allows the capacitor to rapidly take up the energy, when an impermissibly high voltage builds up across the resistor.

The overvoltage protection apparatus can have a controllable power semiconductor, in particular a thyristor, in parallel with the resistor. This allows the low-resistance current path to be connected.

The overvoltage protection apparatus can comprise an overvoltage element, e.g. a varistor, in parallel with the capacitor. Furthermore, a discharge resistor can be present in parallel with the capacitor, wherein said discharge resistor in particular has a value greater than 1 kohm, in particular greater than 10 kohms or greater than 100 kohms. As a result, discharging of the capacitor is assisted by virtue of the energy being dissipated if the voltage on the capacitor is excessively high, and the overvoltage protection apparatus is quickly made operational again in the event of repeated tripping.

The switching unit can comprise a second power semiconductor, wherein the two power semiconductors are connected in antiseries or antiparallel. The power semiconductors can be IGBTs, for example.

FIG. 1 schematically shows a DC network 10. The DC network 10 comprises a DC voltage source 11 and a load 16, which are connected to one another by electrical conductors 121 . . . 123. In this case, the first two conductors 121, 122 together form a first pole of the DC network 10, while the third conductor 123 forms the second pole. The first two conductors 121, 122 are connected in series with one another, wherein a switching unit 19 is arranged at their connecting point.

The switching unit 19 serves as an interrupter for the electrical connection between the DC voltage source 11 and the load 16. An interruption can be necessary, for example, if a fault, that is to say a short circuit, arises in the region of the load 16 and very high current would flow from the DC voltage source 11 to the short circuit location. The switching unit 19 comprises at least one power semiconductor that is connected in series between the two first conductors 121, 122 and can interrupt the current path through said conductors. In some embodiments, the switching unit 19 can also comprise two power semiconductors that are connected in antiseries.

Since there is no freewheeling path for the current in the event of the current path being interrupted by the switching unit 19, an excessive voltage occurs across the switching unit 19, that is to say across the power semiconductor, shortly after the interruption. The level of the excessive voltage depends, amongst other things, on the magnitude of the inductor in which electrical energy is stored. This is in turn definitively determined by the inductance of the first two conductors 121, 122 adjoining the switching unit. The longer these conductors 121, 122 are, the greater their inductance. So that the switching unit 19 does not have to be adapted to suit the conductor length, the first two conductors 121, 122 are divided into sections 141 . . . 146. The sections 141 . . . 146 in this example are chosen in such a way that the conductor length of each section 141 . . . 146 is not more than 100 m. The maximum inductance of each of the sections 141 . . . 146 is therefore defined. In an alternative configuration, the sections 141 . . . 146 are chosen in accordance with a defined maximum inductance of 50 µH, for example. In this variant, it is not necessary to take into consideration whether the conductors 121, 122 are of the same kind or whether different electrical conductors are used, in order to maintain a maximum inductance per section 141 . . . 146.

An overvoltage protection apparatus 181 . . . 184 is arranged at the connecting point between each pair of adjacent sections 141 . . . 146. The overvoltage protection apparatus 181 . . . 184 is connected between the connecting point, which is in the first two conductors 121, 122 and is therefore part of the first pole of the DC network 10, and the second pole in the form of the third conductor 123. The overvoltage protection apparatuses 181, 182 in the first conductor 121 are therefore connected in parallel, barring the inductance 152 of the interposed second section 142. The overvoltage protection apparatuses 183, 184 in the second conductor 122 are likewise connected in parallel, barring the inductance 155 of the interposed fifth section 145.

The overvoltage protection apparatuses 181 . . . 184 ensure that the occurrence of overvoltages in the conductors 121, 122 is prevented or delayed in sections when the flow of current is interrupted by the switching unit 19. The effect achieved by this is that a developing overvoltage at the switching unit 19 is limited to the effect of the inductance of those sections 141, 144 that meet the switching unit 19 directly. The switching unit 19 is expediently configured for overvoltages of this kind. The effect achieved by this is therefore that the switching unit 19 can be used without being adapted even if the electrical conductors present 121, 122 are substantially longer than the maximum inductance value for the switching unit 19 would allow. A change in the switching unit 19 is therefore replaced by an adaptation to the layout of the conductors 121, 122 that are provided with the overvoltage protection apparatuses 181 . . . 184. The switching unit itself has an overvoltage protection system, not shown, that is sufficient for the line length or inductance at the switching unit, for example an overvoltage protection system for an inductance of 100 µH.

A real DC network 10 in an industrial environment is typically more complex and comprises multiple loads 16, multiple electrical conductors 121 . . . 123, some of different length, and a plurality of switching units 19. Furthermore, it can also have branches. The DC network 10 of FIG. 1 can therefore be seen as a simplified detail from a real DC network. However, some embodiments use only switching units 19 of a single design even in an extensive DC network 10. The overvoltage protection apparatuses 181 . . . 184 may also be of only one design.

Figure 2:
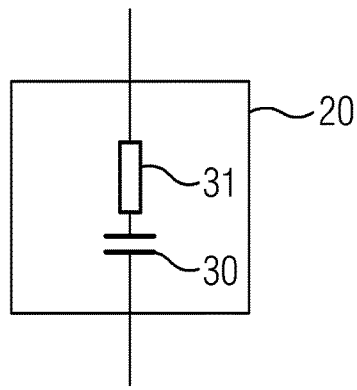
FIGS. 2 to 6 show variants of the overvoltage protection apparatuses.

Possible variants for the design of the overvoltage protection apparatuses 181 . . . 184 are illustrated in FIGS. 2 to 6. In some embodiments, a capacitor 30 is sufficient as overvoltage protection apparatuses 181 . . . 184. Said capacitor provides voltage stability and control reserve. Since said capacitor 30 forms an oscillating system with the line inductance 151 . . . 156, however, a series resistor 31 may provide damping. This overvoltage protection apparatus 20 is shown in FIG. 2.

Figure 3:
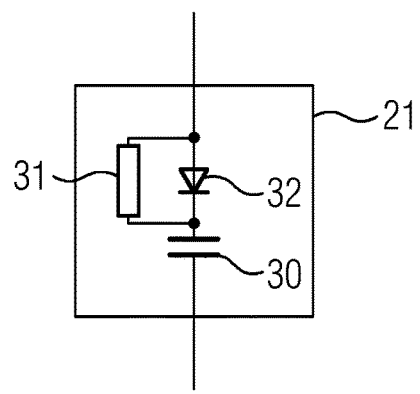

FIG. 3 shows an extended overvoltage protection apparatus 21 in accordance with the embodiment of FIG. 2, in which a diode 32 is present in parallel with the series resistor 31. This has the effect that the capacitor 30 can take up energy very rapidly, this being limited by the series resistor 31 in the embodiment based on FIG. 2. Specifically when a short circuit is disconnected, it is important that the energy is taken up very rapidly. The discharging continues to be damped by the series resistor 31, however.

Figure 4:
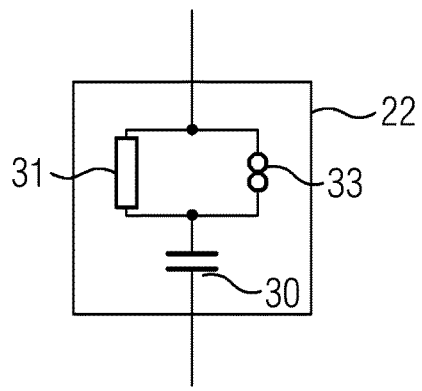

FIG. 4 shows an alternative to using the diode 32. In the overvoltage protection apparatus 22 based on FIG. 4, a spark gap 33 is arranged in parallel with the series resistor 31 in order to create a low-resistance current path when an impermissibly high voltage builds up across the series resistor 31. If the voltage across the spark gap 33 becomes low enough, the arc in the spark gap 33 is quenched again. The capacitor 30 is again discharged via the series resistor 31.

Figure 5:
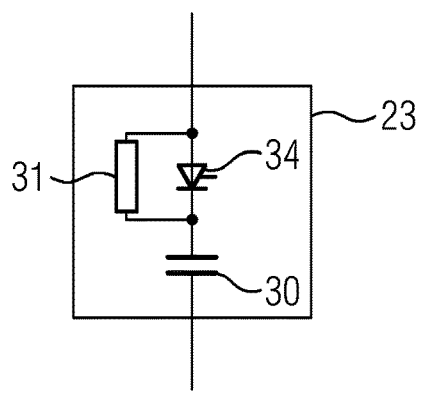

A further alternative is illustrated in FIG. 5. In the case of this overvoltage protection apparatus 23, the low-resistance current path can be connected by a triggered semiconductor device, such as by the thyristor 34 in this example. If the current through the thyristor 34 here becomes lower than its holding current, said thyristor changes to a high-resistance state again. The capacitor 30 is again discharged via the series resistor 31.

Figure 6:
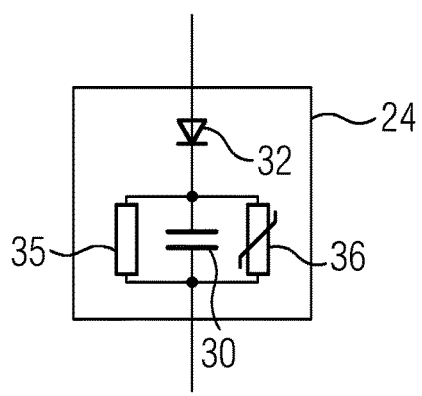

In the overvoltage protection apparatus 24 based on FIG. 6, discharging of the capacitor 30 is assisted by a discharge resistor 35 and an overvoltage element, such as the varistor 36 shown here, in order to dissipate the energy if the voltage on the capacitor 30 is excessively high and to quickly make the protective circuit operational again in the event of repeated tripping. In this case, the discharge resistor 35 and the varistor 36 are arranged in parallel with the capacitor 30. In this example, a diode 32 is arranged in series with the capacitor 30. This example can also be combined with the embodiments of FIGS. 3 to 5, however, i.e. a series resistor 31 or a spark gap 33 in series with the capacitor 30 can also be used here.

LIST OF REFERENCE DESIGNATIONS

10 DC NETWORK
121 . . . 123 Electrical line

141 ... 146 Section
151 ... 156 Inductance of the sections
11 DC voltage source
19 Switching unit
16 Load
181 ... 186 Overvoltage protection apparatus
20 ... 24 Variants of the overvoltage protection apparatus
30 Capacitor
31 Series resistor
32 Diode
33 Spark gap
34 Thyristor
35 Discharge resistor
36 Varistor

What is claimed is:

1. A DC network comprising:
an electrical conductor;
a switching unit arranged at one end of the conductor to break the electrical connection via the conductor, the switching unit including a controllable power semiconductor connected in series in the current path of the conductor;
wherein the conductor includes a first section and a second section starting from the switching unit with a connection point between the first section and the second section;
a first overvoltage protection apparatus connected between the connecting point and a second pole of the DC network; and
a second overvoltage protection apparatus connected between that end of the second section remote from the switching unit and the second pole;
wherein the overvoltage protection apparatuses each have a capacitor; and
wherein a length or an inductance of each section affects an overvoltage that forms in the event of disconnection by the switching unit to ensure the overvoltage remains below a breakdown voltage of the controllable power semiconductor.

2. The DC network as claimed in claim 1, further comprising:
a load;
a plurality of further switching units; and
a plurality of further electrical conductors connecting the switching units and load;
wherein each conductor of the plurality of further electrical conductors are divided into sections; and
an overvoltage protection apparatus for the connecting points for each pair of connected sections of the further conductors connected between the connecting point and the second pole.

3. The DC network as claimed in claim 2, wherein the switching unit and the further switching units are of the same design.

4. The DC network as claimed in claim 1, wherein the switching unit comprises a switching unit capacitor connected between the first and second poles of the DC network and has a capacitance of at least 10 μF.

5. The DC network as claimed in claim 1, wherein the capacitors of the overvoltage protection apparatuses each have a capacitance of at least 10 μF.

6. The DC network as claimed in claim 1, wherein the overvoltage protection apparatuses each have an oscillation damping resistor connected in series with the capacitor.

7. The DC network as claimed in claim 1, wherein:
the overvoltage protection apparatuses each comprise a diode connected in series with the capacitor; and
the diode is connected to block a flow of current from the capacitor to the first pole.

8. The DC network as claimed in claim 1, wherein the overvoltage protection apparatuses each comprise a spark gap connected in series with the capacitor.

9. The DC network as claimed in claim 1, wherein the overvoltage protection apparatuses each have a controllable power semiconductor connected in series with the capacitor.

10. The DC network as claimed in claim 1, in which the overvoltage protection apparatuses each comprise an overvoltage element in parallel with the capacitor.

11. The DC network as claimed in claim 1, wherein the overvoltage protection apparatuses each comprise a discharge resistor in parallel with the capacitor.

* * * * *